Jan. 5, 1960  H. E. NICHOLLS  2,919,720
FLEXIBLE EXHAUST EXTENSION
Filed Feb. 16, 1955
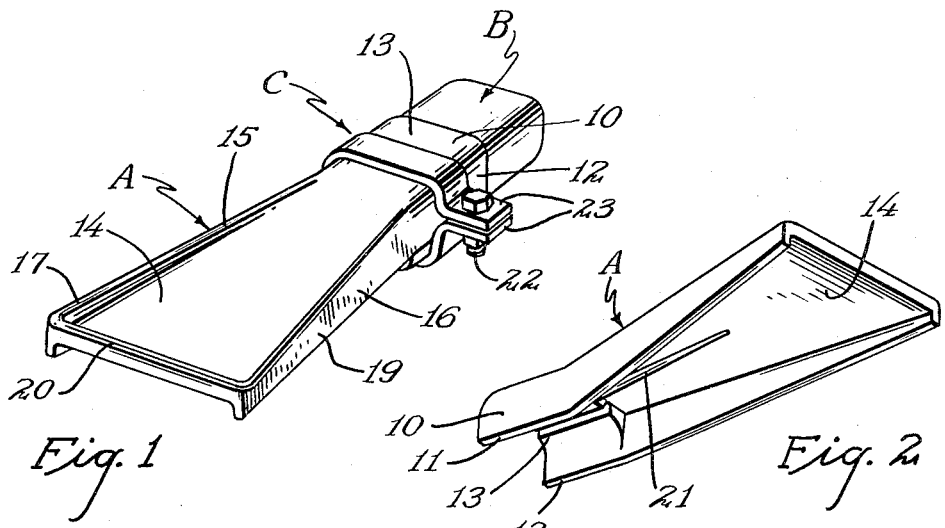
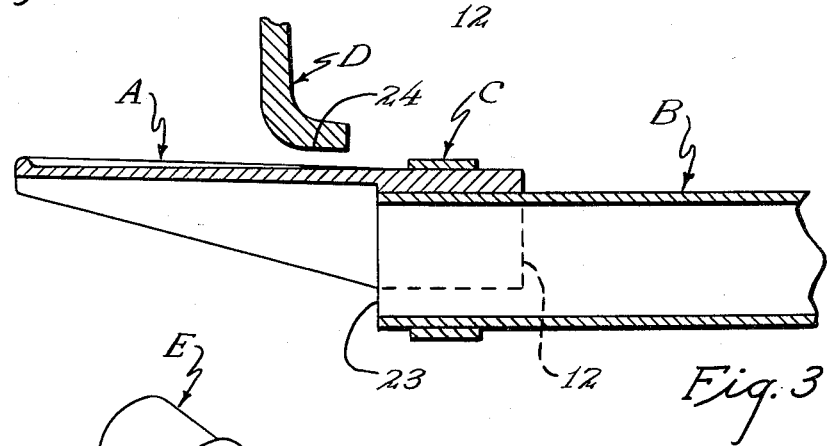
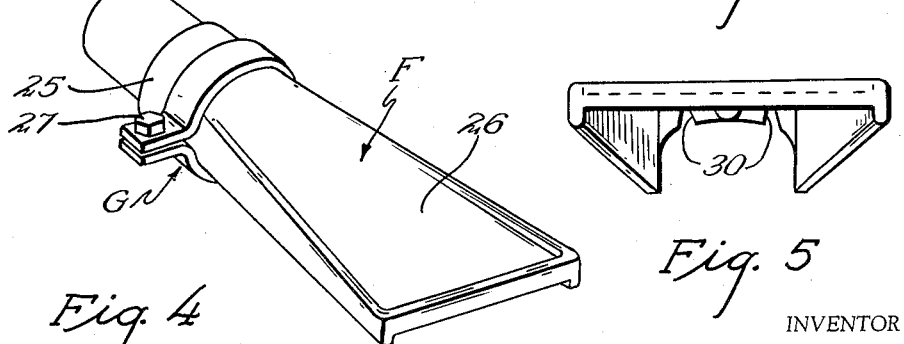
INVENTOR
Harold E. Nicholls
BY Robert M. Dunning
ATTORNEY United States Patent Office 2,919,720
Patented Jan. 5, 1960

2,919,720

FLEXIBLE EXHAUST EXTENSION

Harold E. Nicholls, Stillwater, Minn.

Application February 16, 1955, Serial No. 488,526

3 Claims. (Cl. 138—46.5)

This invention relates to an improvement in tail pipe extensions and deals particularly with a flexible extension designed for use upon the exhaust tail pipe of automobiles and the like.

There is some problem involved in the manufacture of automobile tail pipes. If these pipes project rearwardly beyond the rear bumper they are extremely vulnerable to injury and often become damaged in the event the automobile backs too close to another car or to a high curb or some other obstruction. On the other hand, if the tail pipe terminates short of the rear bumper of the car, the fumes from the exhaust pipe seriously stain the bumper and other attached parts which are usually plated. Thus the appearance of the rear of the car can be considerably marred by the exhaust gases.

It is an object of the present invention to provide an extension for use upon tail pipes and which form a flexible and resilient extension therefor. This extension element is made of resilient material such as rubber or a similar resilient composition and acts as a baffle to prevent the fumes from the tail pipe from being blown against the bumper or other portions of the car at the rear of the body.

A feature of the present invention resides in the fact that the tail pipe extension will readily flex out of its normal position in the event the extension strikes an obstruction, and thus the tail pipe will not be injured when the car is backed into another vehicle or some other obstruction. At the same time, however, the extension projects sufficiently far from the tail pipe to prevent the fumes from the exhaust from directly contacting the under parts of the vehicle.

A feature of the present invention lies in the provision of a tail pipe extension which will enhance the appearance of the car and which will at the same time eliminate injury to the tail pipe. The design of the extension is such as to add to the appearance of the car but the resilient nature of the extension prevents its injury.

A further feature of the preferred form of construction of the extension lies in the particular shape and form of the device. Preferably the extension clamps over the upper surface of the tail pipe near its rear extremity and projects rearwardly beneath the vehicle bumper so that the fumes from the tail pipe are guided to a point to the rear of the car.

A further feature of the invention lies in the provision of a tail pipe extension having air passages therethrough through which air may be drawn to be mixed with the exhaust. This air tends to cool the extension and prevent any overheating thereof.

These and other objects and novel features of my invention will be more clearly and fully set forth in the following specification and claims.

In the drawings forming a part of the specification:

Figure 1 is a perspective view of the tail pipe extension in place upon a tail pipe.

Figure 2 is a bottom perspective view of the extension removed from the tail pipe.

Figure 3 is a sectional view through a portion of the tail pipe and extension and indicating its relation to a vehicle bumper.

Figure 4 is a perspective view of a tail pipe extension of modified form.

Figure 5 is a front elevation view of the tail pipe extension.

The tail pipe extension illustrated at A in Figures 1, 2 and 3 of the drawings is preferably designed to fit over a tail pipe of oval form, although it may also be of rectangular shape. As illustrated in the drawings, the extension A includes an attaching end 10 which is generally channel-shaped in form including generally parallel sides 11 and 12 and a connecting base portion 13. When attached, the base 13 of the attaching portion 10 is uppermost, as indicated in the drawings, and the channel-shaped sides 11 and 12 extend partially around the periphery of the tail pipe B.

The attaching portion 10 gradually blends into a deflector portion 14 designed to extend rearwardly beyond the end of the tail pipe B. The deflector portion 14 may be of somewhat lighter construction than the attaching portion 10 and is shown as having sides 15 and 16 which diverge apart from their connection with the attaching portion 10. Thus, in the particular arrangement illustrated, the deflector portion 14 is a trapezoid in plan with the shorter parallel edge of the trapezoid integrally attached to the attaching portion 10.

As is shown in the drawings the deflector portion 14 also includes tapering side walls 17 and 19 which diminish in height from the point of connection with the attaching portion 10 to the rear extremity of this portion. These side walls 17 and 19 preferably extend slightly above the level of the deflector portion 14 and extend substantially downwardly therefrom so as to reinforce the structure. A rib 20 also extends upwardly from the upper surface of the wider parallel side of the trapezoidal deflector so as to reinforce this end.

As may be seen in Figure 2 of the drawings, the attaching portion is preferably curved on its inner surface to snugly fit about the tail pipe B. A stiffening rib 21 extends centrally along the center portion of the under surface of the deflector portion 14 for a distance from the attaching portion 10, this rib acting as a further reinforcement for the deflector.

The extension A is held in place by any suitable means such as by the clamp C illustrated in Figures 1 and 3 of the drawings. This clamp C is made of somewhat flexible and resilient material so that the ends of the clamp may be drawn together to clamp the attaching end of the extension to the rear end of the tail pipe. A bolt 22 or other clamping means is shown extending through the ends 23 of the clamp 20 so as to attach the extension securely in place.

When in position, the tail pipe B usually will terminate forwardly of the rear bumper D of the vehicle. As indicated in Figure 3 the rear end of the tail pipe 23 is forwardly of the bumper D and is somewhat below the lower edge 24 of the bumper D. The extension A extends beneath the bumper and rearwardly thereof as is illustrated.

In the event the extension A strikes the bumper of a vehicle to the rear of the vehicle on which it is mounted or strikes some other obstruction, the extension will flex or bend properly to prevent injuries to the end 23 of the tail pipe B. As soon as the pressure upon the extension is released, the extension will return to its original position. Normally any object bearing against the tail pipe extension will strike the bumper D when the vehicle and obstruction have moved together sufficiently so that no injury to the tail pipe will result.

Figure 5 of the drawings discloses the air passages 30 which may be provided in the tail pipe extension. These passages 30 extend longitudinally along the inner surface of the attaching end 10, preferably in the base portion 13. As this base portion is thicker than the deflector portion 14, the passages 30 may communicate with the under side of the deflector portion 14.

In operation, the exhaust gases forced from the tail pipe are exhausted somewhat below the deflector, and the hot gases do not directly strike the deflector. These gases tend to draw air through the passages 30, cooling the gases and maintaining the deflector at a lower temperature than otherwise would exist.

In Figure 4 of the drawings I disclose a slightly different form of construction which is used on tail pipes E of cylindrical form. The extension F shown in Figure 4 is very similar to the extension A with the exception of the fact that the attaching end 25 of the extension F has an interior surface which is of partially cylindrical form. The deflector portion 26 is identical to the deflector 14 and the clamp G used with the extension F is very similar to the clamp C but is cylindrical to fit the surface of the attaching portion 25. A clamping bolt 27 holds the clamp G in position.

In accordance with the patent statutes, I have described the principles of construction and operation of my tail pipe extension, and while I have endeavored to set forth the best embodiment thereof, I desire to have it understood that obvious changes may be made within the scope of the following claims without departing from the spirit of my invention.

I claim:

1. A tail pipe extension of relatively thin flexible resilient material including a U-shaped attaching end designed to partially encircle a tail pipe, said U-shaped end having a pair of downwardly extending legs adapted to engage the sides of the tail pipe, and an integral deflector portion having a substantially trapezoidal appearance when viewed in plan substantially flush with the upper surface of said U-shaped end and a pair of downwardly extending side walls commensurate in height with the legs of said U-shaped end at their juncture therewith and gradually diminishing in height as said side walls approach the free end of said deflector portion.

2. A tail pipe extension for use in conjunction with an automobile tail pipe, the extension including an attaching portion and a relatively flat deflecting portion connected to the attaching portion substantially flush with the upper surface thereof and extending rearwardly therefrom, the deflecting portion flaring outwardly from said attaching portion and having angularly inclined side members along opposite flaring edges thereof, said extension being formed of flexible resilient material with said flat deflecting portion normally adapted to extend above the outlet end of an automobile tail pipe.

3. A tail pipe extension of relatively thin flexible resilient material including a U-shaped attaching end designed to partially encircle a tail pipe, said U-shaped end having a pair of downwardly extending legs adapted to engage the sides of the tail pipe, and an integral deflector portion having a substantially trapezoidal appearance when viewed in plan substantially flush with the upper surface of said U-shaped end and a pair of downwardly extending side walls commensurate in height with the legs of said U-shaped end at their juncture therewith and gradually diminishing in height as said side walls approach the free end of said deflector portion, said deflector portion having a rib extending along its free end and adjoining sides, the portions of said ribs extending along the sides diminishing in height as the side walls approach the attaching end.

References Cited in the file of this patent

UNITED STATES PATENTS

| | | |
|---|---|---|
| D. 149,650 | Kelly | May 18, 1948 |
| D. 153,848 | Follen | June 6, 1950 |
| D. 159,098 | Russell | June 20, 1950 |
| 498,458 | Callan | May 30, 1893 |
| 2,097,041 | Powell | Oct. 15, 1936 |
| 2,252,228 | Koch | Aug. 12, 1941 |
| 2,489,480 | Chester | Nov. 29, 1949 |
| 2,558,023 | Walsh | June 26, 1951 |
| 2,677,929 | Russell | May 11, 1954 |

FOREIGN PATENTS

| | | |
|---|---|---|
| 819,642 | Germany | July 8, 1949 |